(12) United States Patent
Reese et al.

(10) Patent No.: US 7,463,865 B2
(45) Date of Patent: Dec. 9, 2008

(54) AUTOMATIC CABLE LOSS COMPENSATION

(75) Inventors: David L. Reese, Glendale, AZ (US); Gregory L. Carlile, El Mirage, AZ (US); Curt A. Gray, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 491 days.

(21) Appl. No.: 11/238,515

(22) Filed: Sep. 28, 2005

(65) Prior Publication Data

US 2007/0072555 A1    Mar. 29, 2007

(51) Int. Cl.
*H04B 1/44* (2006.01)

(52) U.S. Cl. .............................. 455/78; 455/73; 455/80; 455/85; 455/69; 455/83; 333/134; 385/24; 385/27

(58) Field of Classification Search .................... 455/73, 455/78, 80, 69, 85, 83; 333/134; 385/24, 385/27
See application file for complete search history.

(56) References Cited

U.S. PATENT DOCUMENTS

| | | | | |
|---|---|---|---|---|
| 4,697,187 A | * | 9/1987 | Ohno et al. ................. | 342/358 |
| 5,025,485 A | * | 6/1991 | Csongor et al. ............. | 455/13.3 |
| 5,267,071 A | * | 11/1993 | Little et al. ................. | 398/162 |
| 5,485,823 A | * | 1/1996 | Lintott et al. ............... | 123/506 |
| 5,878,329 A | * | 3/1999 | Mallinckrodt ................ | 455/69 |
| 5,889,821 A | * | 3/1999 | Arnstein et al. ............. | 375/285 |
| 5,937,336 A | * | 8/1999 | Kumagai .................... | 455/126 |
| 6,038,428 A | * | 3/2000 | Mizusawa et al. ............ | 455/69 |
| 6,115,587 A | * | 9/2000 | Kim .......................... | 455/126 |
| 6,236,863 B1 | * | 5/2001 | Waldroup et al. ........... | 455/522 |
| 6,253,092 B1 | * | 6/2001 | Nguyen et al. .............. | 455/522 |
| 6,529,710 B1 | * | 3/2003 | Lindemann et al. .......... | 455/69 |
| 6,690,922 B1 | * | 2/2004 | Lindemann .................. | 455/69 |
| 6,711,128 B1 | * | 3/2004 | Ramakrishnan ............. | 370/230 |
| 6,819,478 B1 | * | 11/2004 | Islam ........................ | 359/334 |
| 6,937,600 B2 | * | 8/2005 | Takagi ....................... | 370/394 |
| 6,946,989 B2 | * | 9/2005 | Vavik ......................... | 342/51 |
| 6,949,989 B2 | * | 9/2005 | Vavik ......................... | 342/51 |

\* cited by examiner

*Primary Examiner*—Marceau Milord
(74) *Attorney, Agent, or Firm*—Fogg & Powers LLC

(57) ABSTRACT

Method and apparatus are provided for compensation of an RF link between a transmitter and amplifier of a communication system. The apparatus comprises a signal source coupled to the transmitter for providing an RF test signal of a first magnitude to the RF link, a test signal measuring apparatus at the RF input of the amplifier for measuring a second magnitude of the test signal reaching the RF input of the amplifier through the RF link, and an electronically adjustable attenuator serially coupled with the RF link and responsive to differences between the first and second magnitudes so as to provide attenuation in an RF communication signal passing into the amplifier from the RF link such that the sum of RF signal loss in the link and the attenuator has a predetermined value.

20 Claims, 4 Drawing Sheets

AUTOMATIC CABLE LOSS COMPENSATION

TECHNICAL FIELD

The present invention generally relates to compensation of cable loss, and more particularly relates to automatic compensation of radio frequency cable losses for aircraft systems and other applications.

BACKGROUND

There are many applications today where communication system receivers, transmitters, power amplifiers and other elements are interconnected by electrical cables carrying radio frequency (RF) signals. For convenience of description, the combination of a receiver and transmitter is referred to herein as a "transceiver", abbreviated as "T/R". For proper operation the signal losses occurring in these cables must be taken into account in designing and constructing the systems. If the size and/or configuration of the installations vary from application to application, then the cable losses will likely also vary and must therefore be adjusted or compensated for each system installation. In the aviation industry for example, various standards have been adopted to attempt to limit the variability encountered in such system installations. A non limiting example is in the installation in aircraft of satellite communication systems for use with the Inmarsat® satellites.

FIG. 1 is a simplified electrical schematic block diagram of airborne satellite communication system 20 according to the prior art, suitable for use with the Inmarsat satellites, which operate for example at frequencies in the range of 1,626.5 to 1,660.5 mega-Hertz, but such frequencies are not critical to the present invention. System 20 comprises transceiver (T/R) 22 coupled by RF pathway 23 to high power amplifier (HPA) 24. HPA 24 is coupled by RF pathway 25 to diplexer 26. Diplexer 26 is coupled by RF pathway 27 to antenna 30 and by RF pathway 29-1 to low noise amplifier (LNA) 28. LNA 28 is coupled by RF pathway 29-2 to T/R 22. LNA 28 may be combined with diplexer 26 so that only a single pathway (hereafter RF pathway or link 29) is needed. Either arrangement is useful. Diplexer 26 is conventional and separates the incoming and outgoing RF signals. Incoming RF signals received from antenna 30 are directed by diplexer 26 to LNA 28 where they are amplified and sent over RF link 29 to T/R 22 where they are demodulated and/or decoded and the results presented to the user in audio or other form via communication link 32. Similarly, outgoing communications received from the user via link 32 are modulated and/or encoded by T/R 22 to form a modulated and/or encoded RF signal that is sent via RF link 23 to HPA 24 where it is amplified and sent via RF link 25 to diplexer 26, which in turn directs it to antenna 30 over RF link 27. Elements 22, 24, 26, 28 and 30 of RF communication system 20 are conventional and well known in the art.

HPA 24 is typically physically located close to diplexer 26 and antenna 30 to minimize loss of signal power over link 25. However, T/R unit 22 may be near or far from HPA 24 depending upon the size and configuration of the aircraft Thus signal losses in, for example, link 23 can be a serious concern. To accommodate this installation variability, a standard has been adopted in the aviation industry requiring that transceiver (T/R) 22 deliver a power level sufficient to overcome up to 25 dB of cable loss in link 23 and still provide adequate drive at input 24-1 of HPA 24. A lower limit of 19 dB of cable loss is also specified to minimize the dynamic range that is required at input 24-1 to HPA 24. If the actual loss along RF cable or link 23 for a particular installation is less than the 19 dB minimum, then additional loss must be inserted in the cabling to force the signal arriving at HPA 24 to conform to the 19-25 dB loss range specified in the standard. One or more fixed or manually settable attenuators 34 are provided at input 24-1 of HPA 24 or in RF cable or link 23 between T/R 22 and HPA 24 to adjust the RF signal loss along link 23 to meet the desired specification, for example, 19-25 dB total loss in the case of Inmarsat communication systems. Attenuator(s) 34 are set to the necessary attenuation during system design and installation and generally depend upon the aircraft size and configuration. Attenuator(s) 34 will often vary from installation to installation and aircraft to aircraft because of differences in aircraft size and wiring configuration.

These additional attenuators and/or other custom components add weight, increase installation time and reduce overall system reliability due to the extra cable connectors and fittings that may loosen or degrade over time. They also make system maintenance more complex and expensive since different aircraft in the same fleet may have different attenuator configurations and/or settings so that different parts and documentation are needed for the various planes being serviced by the same installation and/or maintenance organizations. Accordingly, it is desirable to provide a cable loss compensation system that avoids the need for different attenuation and compensation devices. In addition, it is desirable that cable loss compensation and/or industry standard loss specifications be achievable with a common system for different aircraft. It is further desirable that the cable loss compensation means and method be capable of automatic operation so that loss compensation is achieved without human intervention. It is additionally desirable that the system be able to compensate in whole or part for changes in cable loss that occur over time due to system aging or other factors. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for compensation of RF coupling between a transmitter and amplifier of a communication system. The apparatus comprises a signal source coupled to the transmitter for providing an RF test signal of a first magnitude to the RF coupling, a test signal measuring apparatus at the RF input of the amplifier for measuring a second magnitude of the test signal reaching the RF input of the amplifier through the RF coupling, and an electronically adjustable attenuator serially coupled between the transmitter and the RF input of the amplifier and responsive to differences between the first and second magnitudes so as to provide attenuation in an RF communication signal passing into the amplifier from the RF coupling such that the sum of RF signal loss in the coupling and the attenuator has a predetermined value A method is provided for compensation of an RF communication link between a transmitter and amplifier of a communication system. The method comprises sending a test signal of known initial strength through the RF communication link to an input port of the amplifier, comparing a received strength of the test signal at the input port to the initial strength, determining the path loss of signal strength through the RF communication link, and automatically setting a variable attenuator in the communication link so that the combination of the path loss and attenuation loss has a predetermined value.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein the term "radio frequency" and the abbreviation "RF" are intended to be interpreted broadly and include all portions of the electromagnetic spectrum suitable for the transmission of modulated or coded signals. For convenience of explanation, the present invention is described for a communication system useful with the Inmarsat satellite system, but this is not intended to be limiting and the present invention is application to any type of RF systems where automatic compensation of a connecting cable or other transmission medium is useful. For convenience of illustration in FIGS. 1-3, RF signal pathways are shown as heavy lines and control or input signals (whether analog or digital) are shown as light lines.

Figure 1:
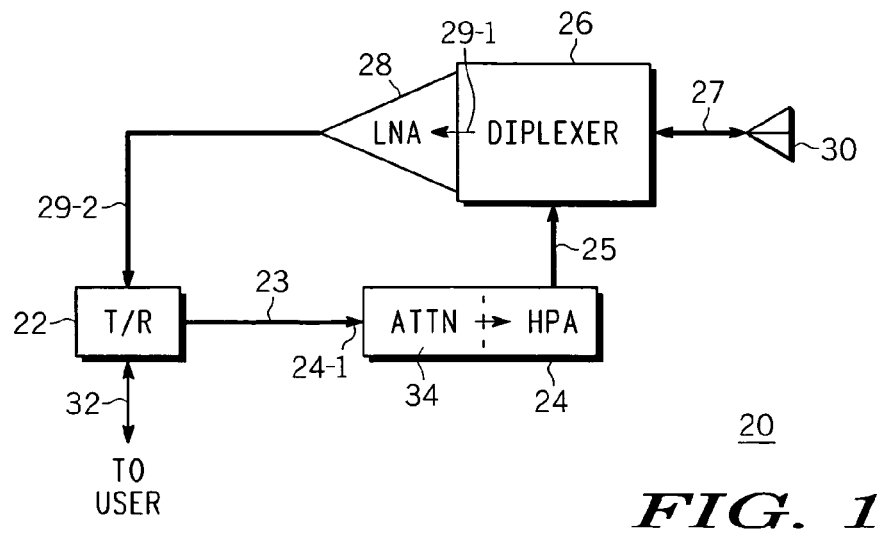
FIG. 1 is a simplified electrical schematic block diagram of an airborne satellite communication system according to the prior art.
Figure 2:
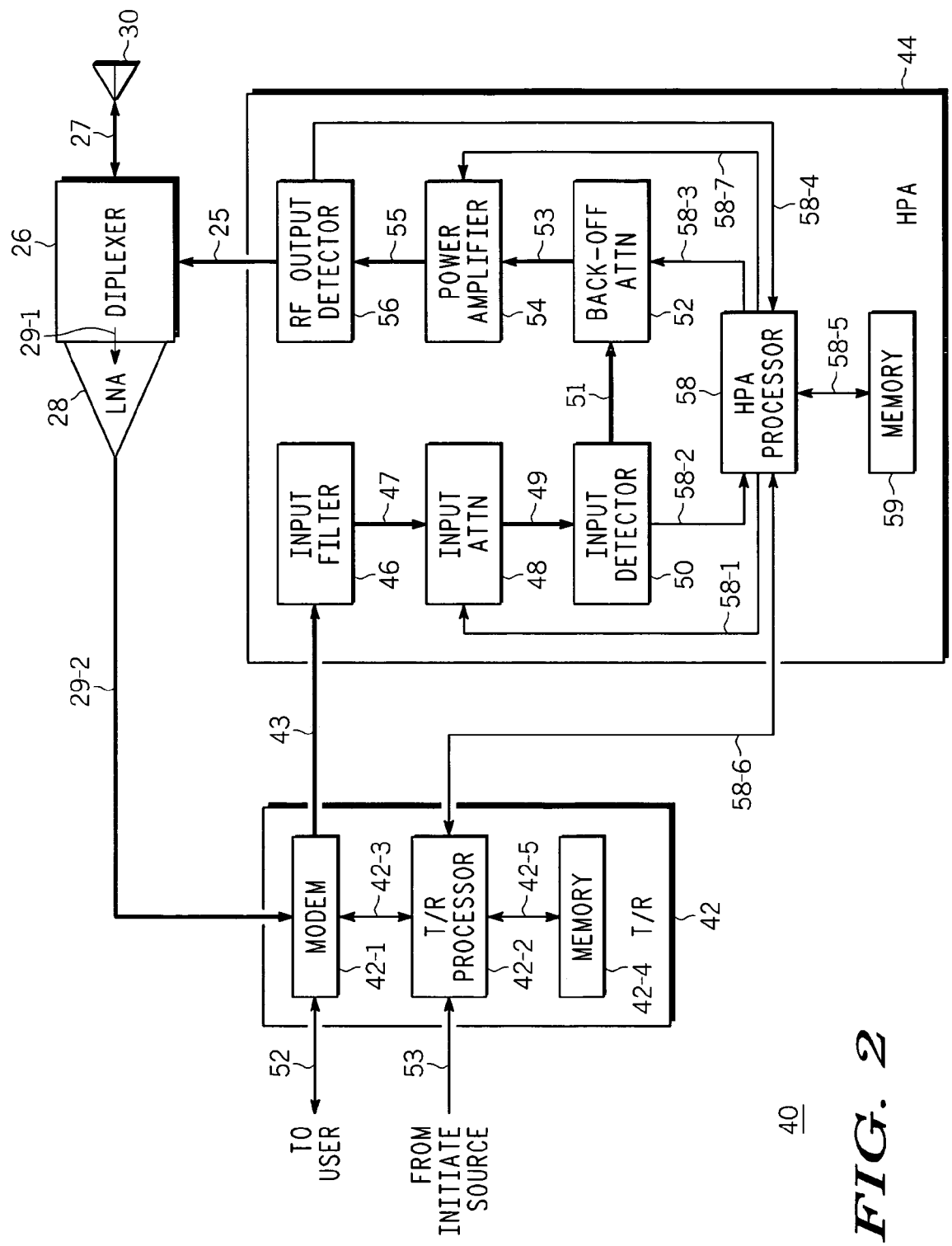
FIG. 2 is a simplified electrical schematic block diagram of a loss compensation system of the present invention, applied to a communication system of the type illustrated in FIG. 1, according to a first embodiment.

FIG. 2 is a simplified electrical schematic block diagram of loss compensation system 40 of the present invention, applied to a communication system of the type illustrated in FIG. 1, according to a first embodiment. System 40 comprises diplexer 26 coupled to antenna 30 and low noise amplifier (LNA) 28 coupled to diplexer 26, similar to those employed in prior art system 20. System 40 further comprises transceiver (F/R) 42 that receives signals from LNA 28 over RF link 29 and during ordinary communications provides the same receive and transmit functions as T/R 22 of system 20. The internal components for providing these normal communication functions are well known in the art and are generally omitted in FIGS. 2-3 in order not to obscure the elements of the present invention needed for providing cable loss compensation. T/R 42 also comprises modem 42-1 and T/R processor 42-2 coupled by signal link 42-3. T/R 42 also comprises memory 42-4 coupled to processor 42-2 by signal link 42-5. Modem 42-1, T/R processor 42-2 and/or memory 42-4 are useful for providing cable loss compensation but may also provide functions associated with the normal communication mode of operation of system 40. User communication I/O is conveniently provided via signal link 52 to modem 42-1 during normal communication operation of system 40. System 40 is switched into the cable loss compensation mode via an initiate signal received over signal link 53. This initiate signal may be provided automatically upon system power-up or by an operator input (e.g., a user activated "compensate" switch or other means) or by a command issued by the aircraft flight control or maintenance management system according to instructions stored therein. Either arrangement is useful. T/R 42 is coupled by RF cable or link 43 (analogous to pathway or link 23 of system 20) to high power amplifier (HPA) 44.

During normal communications, HPA 44 amplifies the modulated RF signal received from T/R 42 and sends it over RF link 25 to diplexer 26 and thence to antenna 30. System 40 differs from system 20 in that system 40 according to the present invention includes means and methods for providing automatic cable loss compensation, which otherwise with system 20 must be performed by physical modification of the system hardware. HPA 44 of system 40 comprises input filter 46, input attenuator (ATTN) 48, input detector 50, back-off attenuator 52, power amplifier 54, and RF output detector 56, wherein these elements are coupled respectively by RF links 47, 49, 51, 53, and 55. Input filter 46, back-off attenuator 52, power amplifier 54 and output detector 56 are conventional and provide the same function as similar elements (not shown) in system 20. HPA 44 of system 40 further comprises HPA processor 58 and associated memory 59. Input filter 46 receives an RF signal from RF pathway or link 43 and removes unwanted sidebands or noise signals. RF output detector 56 provides feedback to HPA processor 58 on the output power being developed by amplifier 54. Detector 56 is coupled to RF output path 25. In the present invention, processor 58 is coupled to input attenuator 48 by signal path or bus 58-1, to input detector by signal path or bus 58-2, to back-off attenuator 52 by signal path or bus 58-3, to RF output detector 56 by signal path or bus 58-4 and to memory 59 by signal path or bus 58-5. HPA processor 58 is also coupled to T/R processor 42-2 by digital communication bus or signal link 58-6, and to amplifier 54 by optional bus or control link 58-7.

Figure 3:
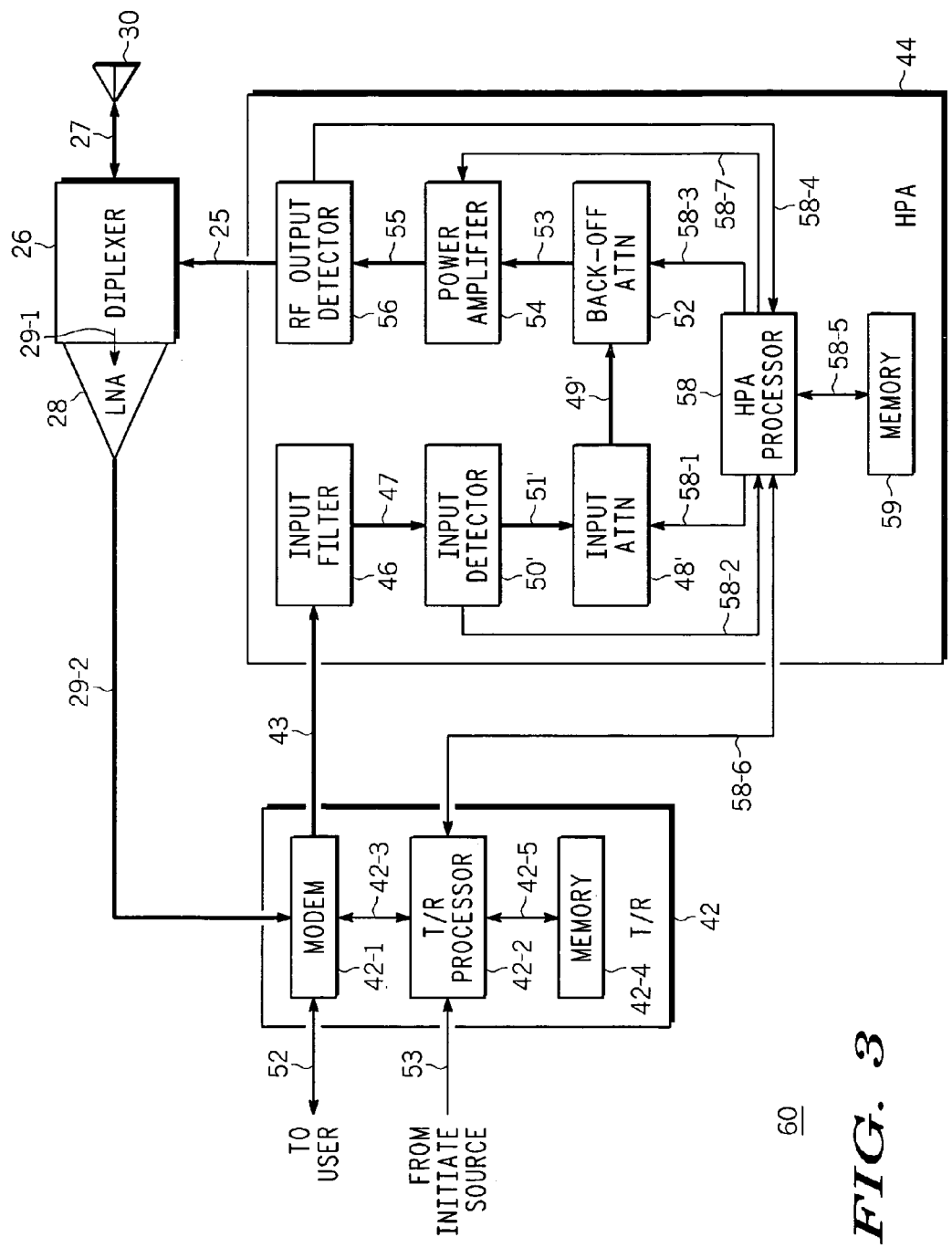
FIG. 3 is a simplified electrical schematic block diagram of a loss compensation system of the present invention, according to a further embodiment.

FIG. 3 is a simplified electrical schematic block diagram of loss compensation system 60 according to a further embodiment of the present invention. System 60 comprises elements 42, 42-1, 42-2 and 42-3 that are analogous in function to similarly identified elements of system 40, which description thereof is incorporated herein by reference. Similarly, system 60 comprises elements 44 to 58-6 that are analogous in function to similarly identified elements of system 40, which description thereof is also incorporated herein by reference. Systems 40 and 60 differ in that in system 40 of FIG. 2, input attenuator 48 is located in the RF signal pathway ahead of input detector 50, whereas in system 60, input detector 50' is located in the RF signal pathway ahead of input attenuator 48'. In system 60, the RF signal arriving over RF cable or link 43 passes through input filter 46 and is sent to input detector 50' via RF link 47. From input detector 50', the RF signal passes via RF link 51' to input attenuator 48'. From input attenuator 48', the RF signal passes to back-off attenuator 52 via RF link 49'. The rest of the elements and signal links of system 60 are otherwise arranged in substantially the same manner as for the elements of system 40. As will be explained the operation of the systems 40 and 60 is slightly different, but either arrangement is useful. Accordingly, the operation of systems 40 and 60 will be described together. While input attenuator 48' and back-off attenuator 52 are shown as separate elements in FIG. 3, this is not essential and they may be combined as a single attenuator providing a combined function.

The operation of systems 40 and 60 in a cable loss compensation mode is now described. Acting under the control of T/R processor 42-2, modem 42-1 generates an RF test signal of known strength that is sent via link 43 to HPA 44 where it is received via input filter 46. Element 42-1 is identified in FIGS. 2-3 as a "modem" and a modem is useful for generating the cable compensation test signal. However, a modem per se is not essential for the cable compensation mode of operation and any type of test signal generator may be used for element 42-1. Accordingly, element 42-1 is also more generally referred to in the cable compensation mode of operation as a "test signal source" and the label "modem" is intended to include this broader description of element 42-1, that is, comprising any suitable form of signal generator for providing the RF test signal used to determine the cable loss. In the case of system 40, after transiting RF link 43 this RF test signal is then passed through input attenuator 48 to input detector 50 and thence to back-off attenuator 52. In the case of system 60, after transiting RF link 43 this RF test signal is then passed via input detector 50' to input attenuator 48' and thence to back-off attenuator 52. Back-off attenuator 52 prevents the RF test signal from being coupled to power amplifier 54 and diplexer 26 via output detector 56 when systems 40, 60 are operating in the cable loss compensation mode. After cable loss compensation is complete and during normal communications, back-off attenuator 52 is reset to zero attenuation (or other predetermined value) and the conventional RF communication signals pass through to power amplifier 54 and via RF output detector 56 to diplexer 26 and antenna 30. Output detector 56 is used to monitor the power output of HPA 44. Back-off attenuator 52 is also useful for adjusting the power output from amplifier 54. When used in conjunction with HPA processor 58 and back-off attenuator 52, output detector 56 can facilitate maintaining a predetermined power output from HPA 44.

In the case of system 40 of FIG. 2, input attenuator 48 is desirably set to zero attenuation when the test RF signal is sent to HPA 44. In that circumstance, the RF signal strength measured at input detector 50, can be compared directly to the transmitted signal strength to obtain the cable loss as the difference between the transmitted RF signal power "TP" sent by T/R 42 and the received RF signal power "RP" at input detector 50. Accordingly, the cable loss CL equals TP-RP. Alternatively, if the loss of input attenuator 48 is not set to zero but has an initial value of ALI, then the cable loss CL equals TP−(RP+ALI) where ALI is the initial attenuator loss. Attenuator 48 is desirably an electrically variable attenuator whose loss AL is determinable. The measured cable loss CL is then used to set the final value of ALF in attenuator 48 so that the desired total loss TL=CL+ALF is obtained and the correct signal strength is provided to power amplifier 54. Electrically controllable RF attenuators are well known in the art.

In the case of system 60 of FIG. 3, input attenuator 48' is located electrically after input detector 50'. Therefore, input detector 50' measures the received RF signal power RP independent of the setting of attenuator 48', and the cable loss CL=TP-RP. This cable loss information is then used to set the value of ALF in attenuator 48' so that the desired total loss TL=CL+ALF is obtained and the correct signal strength is provided to power amplifier 54. Electrically controllable RF attenuators are well known in the art. Following the cable loss auto-compensation function, back-off attenuator 52 is reset to its ordinary communication function value and system 40 or 60 returned to the normal communication (COM) mode. It will be noted that with the arrangement of FIG. 3, system 60, input attenuator 48' and back-off attenuator 52 may be combined and only a single attenuator used for both functions.

Figure 4:
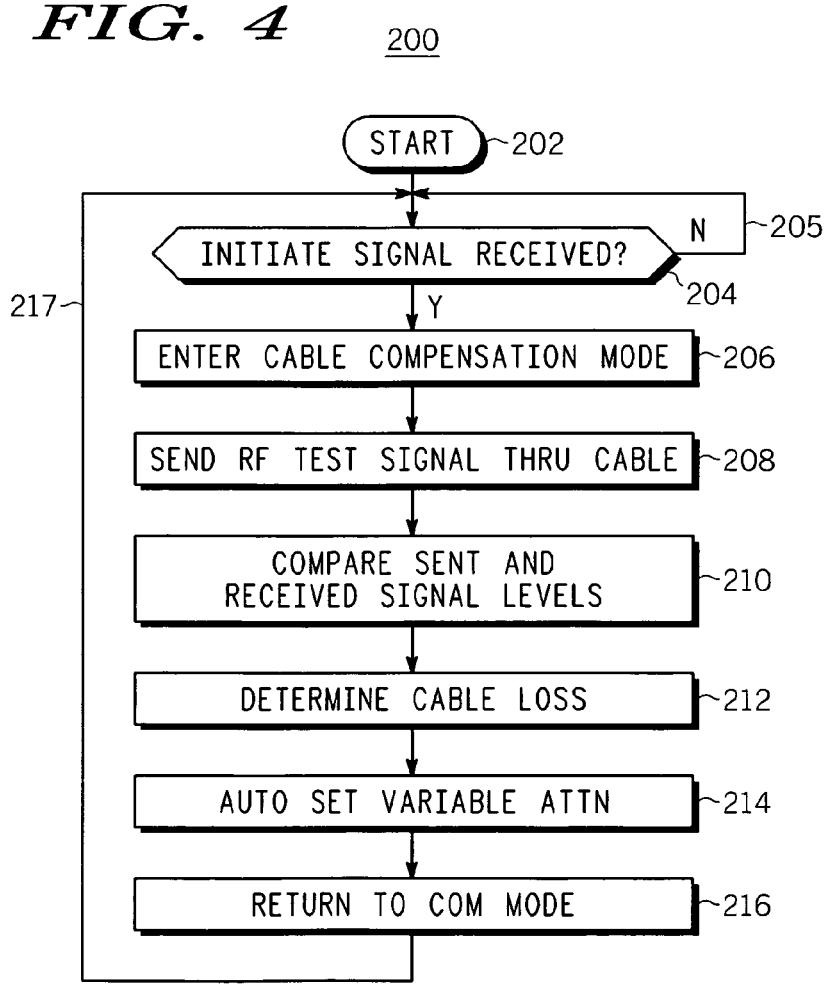
FIG. 4 is a simplified flow chart illustrating a method of the present invention according to a first embodiment.

FIG. 4 is a simplified flow chart illustrating method 200 of the present invention according to a first embodiment. Method 200 begins with START 202 and INITIATE SIGNAL RECEIVED ? query 204, which determines whether or not an initiation signal has been received by system 40 or 60 to start the cable compensation function. The initiate signal may be generated automatically on system power-up, so that cable compensation is automatically triggered whenever satellite communication system 40 or 60 is turned on. Alternatively, the initiate signal may be provided by an operator action, such as depressing a suitable cable compensation control switch. Still further the initiate signal may be provided at predetermined intervals by the flight control system or other aircraft management system. A yet further alternative is to have the cable compensation initiate signal provided by an maintenance control system according to a predetermined schedule, or any combination of the forgoing approaches or other arrangement selected by the system designer, aircraft operator and/or maintenance organization. Any of these arrangements is useful.

If the outcome of query 204 is NO (FALSE), then method 200 loops back as shown by path 205 to await the occurrence of an "initiate" event. If the outcome of query 204 is YES (TRUE) indicating that an initiate event has occurred, the method 200 proceeds to step 206 wherein the normal communication mode of system 40 or 60 is turned off and system 40, 60 is placed in the cable compensation mode of operation. The normal communication mode of operation may be turned OFF in any number of ways, for example and not intended to be limiting, by having processor 58 bock transmission of the RF signal through back-off attenuator to power amplifier 54 or by disabling power amplifier 54 (e.g., by optional link 58-7) or by other means. In subsequent step 208, system 40 or 60 sends an RF test signal through the cable being compensated. As used herein, the word "cable" is intended to include any form of RF signal path coupling T/R 42 and HPA 44 and not be limited merely to conventional coaxial cables. In following step 210 the transmitted and received signals are compared, for example and not intended to be limiting, by comparing TP and RP. In step 212, the cable loss (e.g., CL=TP−RP) is determined, the exact method or calculation depending upon whether the arrangement of system 40 or system 60 or other configuration is being used, as has been previously explained. In step 214 the attenuator in the RF signal path (e.g., attenuator 48, 48') is set by processor 58 or 42-2 or a combination of 42-2 and 58 or an equivalent system processor, to have a value ALF so that the total loss TL=CL+ALF has the desired value for proper system operation. The correct value of attenuator loss ALF to be set can be determined by any number of means, for example, calculated from the CL value determined in step 212 by processors 42-2, 58 or a combination thereof using an algorithm relating the attenuator control input to its attenuation, or by use of a look-up table relating control input to desired attenuation value or other appropriate means. Any suitable arrangement may be used. Then in step 216, system 40 or 60 is returned to its normal communication mode of operation and method 200 returns to START 202 as shown by path 217.

Figure 5:
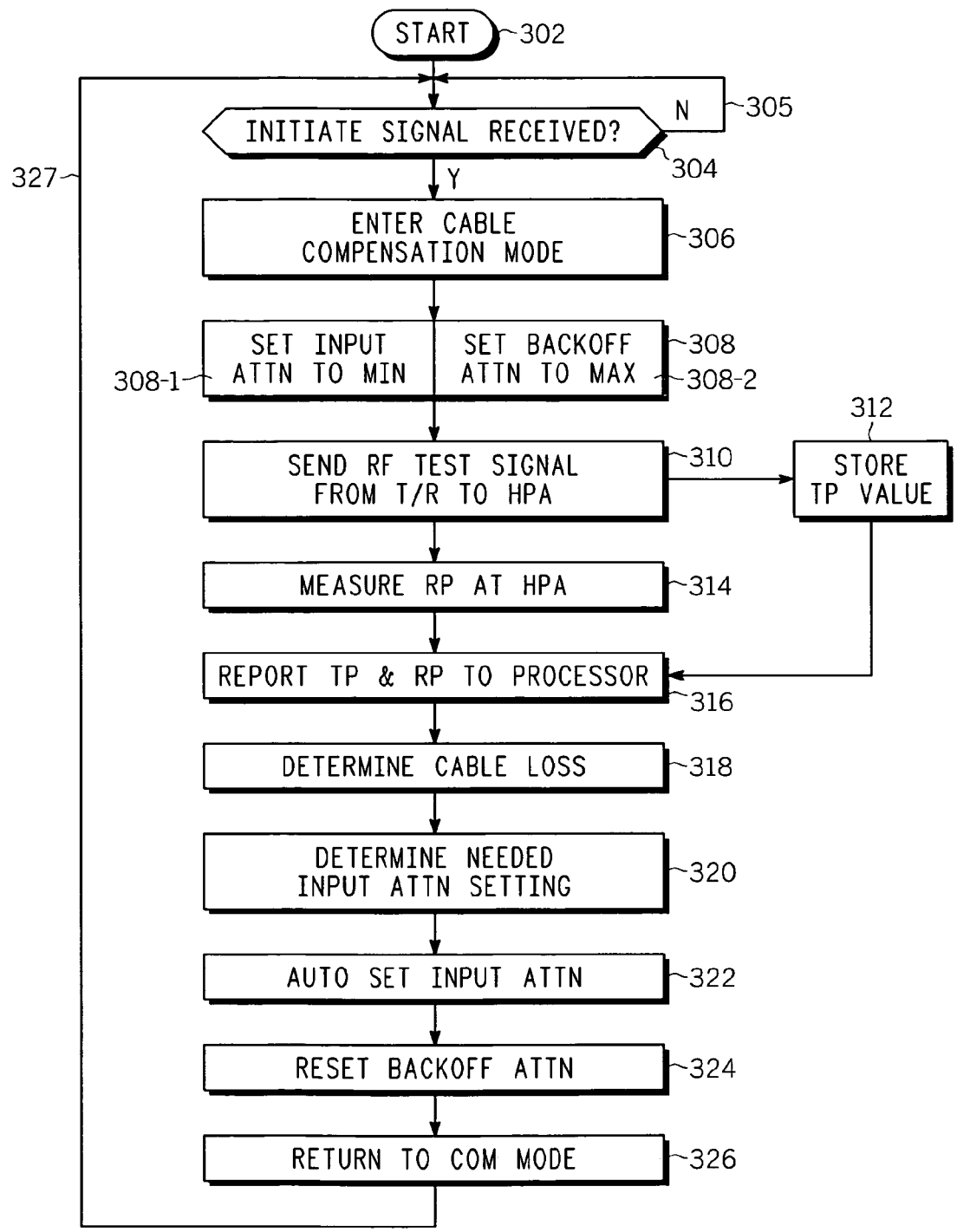
FIG. 5 is a simplified flow chart illustrating a method of the present invention according to a further embodiment and showing further details.

FIG. 5 is a simplified flow chart illustrating method 300 of the present invention according to a further embodiment and showing further details. Method 300 begins with START 302 and INITIATE SIGNAL RECEIVED ? query 304 analogous to query 204 of method 200, which determines whether or not an initiation signal has been received by system 40 or 60 to start the cable compensation function. The occurrence of the initiate signal is explained in connection with query 204 of method 200 and such discussion is incorporated herein by reference. If the outcome of query 304 is NO (FALSE), then method 300 loops back as shown by path 305 to await the occurrence of an "initiate" event. If the outcome of query 304 is YES (TRUE) indicating that an initiate event has occurred, then method 300 proceeds to step 306 wherein the normal communication mode of system 40 or 60 is turned off and system 40, 60 is placed in the cable compensation mode of operation, as previously discussed in connection with step 206 of method 200, which discussion is incorporated herein by reference. In step 308, then in either order, sub-steps 308-1 and 308-2 are executed, wherein in sub-step 308-1 input attenuator 48 is set to its minimum value and in sub-step 308-2 back-off attenuator 52 is set to its maximum value. In following step 310, an RF test signal is sent (e.g. by modem 42-1 operating under the control of T/R processor 42-2) from T/R 42 via RF cable link 43 to HPA 44. In the case of system 40 this RF test signal is sent via input filter 46 and input attenuator 48 to input detector 50. In the case of system 60, this RF test signal is sent via input filter 46 to input detector 50'. In either case, in step 312 the magnitude of the RF test signal, as for example, the transmitted power value TP is stored in memory (e.g., memory 42-4), and in step 314 the magnitude of the signal received by HPA 44 (e.g., the received signal power value RP) is measured by input detector 50, 50'. Any loss occurring in input filter 46 is either negligible or easily taken into account. In step 316, the transmitted and received signal values, e.g., TP and RP, are reported to whichever processor (e.g., processor 42-2, 58, a combination thereof or a separate system processor) is assigned to determine the actual cable loss CL based on these values, as previously explained. In the preferred embodiment, in which T/R processor acts as a primary or supervisory processor and HPA processor 58 acts as a secondary or subsidiary processor, the cable loss determination is carried out by T/R processor 42-2 using routines stored in memory 42-4, but this is not essential. Once the cable loss CL is determined, the attenuation loss value ALF needed to provide a total loss TL=CL+ALF of the proper value is determined. In step 320 the corresponding control signal needed to be supplied from HPA processor 58 to attenuator 48 or 48' to provide ALF is determined, for example, in the same way as already described in connection with method 200 by evaluation of an appropriate algorithm or use of a look-up table or by other means based in whole or in part on information stored in memory 42-4 or 59 operating in cooperation with processor 42-2 or 58 or both. In step 322, the control signal determined in step 320 is automatically provided by processor 58 over lead 58-1 to attenuator 48 or 48' to obtain the desired cable compensation so that TL=CL+ALF. Following cable compensation in step 322, step 324 is executed wherein back-off attenuator 52 is reset to its normal communication operating value and in step 326 the cable compensation routine is terminated and system 40 or 60 is returned to its normal communication mode of operation. Following step 326, method 300 returns to START 302 and initial query 304 as indicated by path 327 to await a subsequent cable loss compensation initiation event.

While system 40 of FIG. 2 and system 60 of FIG. 3 are shown as having their signal processing functions (and associated memory) partitioned into T/R processor 42-2 with memory 42-4 and HPA processor 58 with memory 59, with processors 42-2 and 58 linked by bus 58-6, this is not essential and the functions performed by these separate but linked processors may be combined into a single processor and associate memory. Accordingly, the genera terms "processor" and "system processor" are intended to include either arrangement, that is, either a centralized processing function or a partitioned or distributed processing function. The partitioned arrangement illustrated in FIGS. 2 and 3 are preferred but not essential.

While at least one exemplary embodiment has been presented in the foregoing detailed description, it should be appreciated that a vast number of variations exist. For example, while the present invention has been described for convenience of explanation as applied to an Inmarsat communication system, this is not intended to be limiting and the principles taught herein can be applied to any type of system where RF cable loss compensation is desirable. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A communication system, comprising:
   a transceiver (T/R) adapted to be coupled to an antenna for receiving and demodulating first signals received from the antenna and generating second signals for transmission back to the antenna;
   an amplifier coupled to receive the second signals from the T/R over an RF link, and configured, in response thereto, to amplify the second signals and supply amplified second signals to the antenna for emission therefrom;
   a test signal source coupled to receive a link compensation initiate signal and configured, in response thereto, to generate an RF test signal of known signal strength and cause the RF test signal to be sent over the RF link;
   a detector coupled to receive the RF test signal over the RF link and measure a received signal strength of the RF test signal at the detector;
   an electronically variable attenuator disposed between the T/R and the amplifier and adapted to modify signal attenuation from the T/R to the amplifier; and
   one or more processors for comparing the known signal strength and the received signal strength and setting the variable attenuator so that the signal attenuation from the T/R to the amplifier, including signal attenuation in the RF link and signal attenuation in the variable attenuator, has a predetermined value.

2. The system of claim 1, wherein the one or more processors comprise:
   a first processor coupled to the test signal source; and
   a second processor coupled to the first processor and the electronically variable attenuator.

3. The system of claim 2, further comprising a first memory coupled to the first processor for at least temporarily retaining the initial RF test signal strength for later comparison with the received RF test signal strength.

4. The system of claim 3 further comprising a second memory coupled to the second processor for at least temporarily retaining the received RF test signal strength for comparison to the initial RF test signal strength retained in the first memory.

5. The system of claim 1 wherein the electronically variable attenuator is located in the RF test signal path ahead of the detector.

6. The system of claim 5, further comprising a further variable attenuator coupled between the detector and the amplifier.

7. The system of claim 6, wherein the further variable attenuator is set to maximum attenuation while the RF test signal is being sent over the RF link.

8. The system of claim 1, wherein the detector is located in the RF test signal path ahead of the electronically variable attenuator.

9. The system of claim 8, wherein the electronically variable attenuator is set to maximum attenuation while the RF test signal is being sent over the RF links.

10. A method for compensating an RF communication link of a communication system, wherein the RF communication link is at least part of an RF communication path between a transceiver (T/R) and an amplifier used for sending a user signal from the (T/R) to the amplifier for amplification by the amplifier, before the amplifier sends the user signal to an antenna for emission, the method comprising:

sending a test signal of known initial strength through the RF communication link to an amplifier input port;

comparing a received strength of the test signal at the input port to the known initial strength;

using the comparison as a basis for determining the path loss of signal strength through the RF communication link; and automatically setting a variable attenuator serially coupled to the communication link so that the combination of the path loss and attenuation loss has a predetermined value.

11. The method of claim 10, further comprising prior to the sending step, placing the communication system in a link attenuation compensation mode by substantially disabling the RF signal communication path prior to the output of the communication system.

12. The method of claim 11, wherein the disabling step comprises setting a variable attenuator in the RF signal communication path to maximum attenuation.

13. The method of claim 11, wherein the disabling step comprises disabling an amplifier in the RF signal communication path.

14. The method claim 11, further comprising after the setting step, returning the communication system to a normal T/R mode of operation.

15. The method of claim 10, further comprising prior to the comparing step, storing the initial test signal strength in memory.

16. An RF communication system having a transmitter-amplifier combination compensated for variable coupling loss, wherein the transmitter has an RF signal output and a control signal input and the amplifier has an RF signal input, the combination comprising:

a signal source coupled to the transmitter for providing in response to a loss compensation initiation signal received at the control signal input of the transmitter, an RF test signal of a first magnitude to the RF signal output of the transmitter;

a lossy transmission medium having an input coupled to the RF signal output of the transmitter and an output coupled to the RF signal input of the amplifier, wherein the transmitter is configured to send a user signal to the amplifier through the lossy transmission medium, and wherein the amplifier is configured to amplify the user signal and send the user signal to an antenna for emission by the antenna;

a test signal measuring apparatus coupled between the output of the lossy transmission medium and the RF signal input of the amplifier for measuring a second magnitude of the test signal reaching the RF signal input of the amplifier through the lossy transmission medium; and an electronically adjustable attenuator serially coupled with the lossy transmission medium and responsive to differences between the first and second magnitudes so as to provide an attenuation in an RF communication signal passing into the amplifier from the lossy transmission medium such that the sum of RF communication signal loss in the lossy medium and in the attenuator has a predetermined value.

17. The system of claim 16, wherein the attenuator is serially coupled prior to the test signal measuring apparatus.

18. The system of claim 17, further comprising a further attenuator serially coupled between the test signal measuring apparatus and the amplifier.

19. The system of claim 18, wherein the further attenuator is set to maximum attenuation during the RF test signal.

20. The system of claim 16, wherein the attenuator is serially coupled after the test signal measuring apparatus.

* * * * *